United States Patent [19]

Mengeu

[11] 4,281,773

[45] Aug. 4, 1981

[54] ELECTRICAL WIRING BOX

[75] Inventor: Gary L. Mengeu, Parkersburg, W. Va.

[73] Assignee: GTE Products Corporation, Stamford, Conn.

[21] Appl. No.: 818,308

[22] Filed: Jul. 25, 1977

[51] Int. Cl.³ ............................................. H02G 3/08
[52] U.S. Cl. ................................... 220/3.2; 220/3.94; 174/53; 411/176; 411/352; 411/354; 411/366; 411/522
[58] Field of Search .................. 220/3.2, 3.94; 174/53, 174/58; 85/36; 151/41.75

[56] References Cited

U.S. PATENT DOCUMENTS

| Re. 22,543 | 9/1944 | Tinnerman | 85/36 |
|---|---|---|---|
| 1,599,139 | 9/1926 | Marshall | 85/36 |
| 1,813,678 | 7/1931 | Randall | 85/36 |
| 2,336,153 | 12/1943 | Ryder | 85/36 |
| 3,212,391 | 10/1965 | Duffy | 85/36 |
| 3,895,732 | 7/1975 | Robinson et al. | 174/58 |
| 3,910,156 | 10/1975 | Soltysik | 85/36 |
| 3,955,463 | 5/1976 | Hoehn | 174/53 |

FOREIGN PATENT DOCUMENTS

| 535367 | 4/1941 | United Kingdom | 85/36 |
|---|---|---|---|
| 538426 | 8/1941 | United Kingdom | 85/36 |

Primary Examiner—Joseph Man-Fu Moy
Attorney, Agent, or Firm—David M. Keay

[57] ABSTRACT

An electrical wiring box having a pair of mounting elements associated therewith for permitting the quick and easy mounting of an electrical device within the wiring box. Each mounting element has a central portion with a screw receiving opening. Side portions extend from the central portion and deflective V-shaped flanges including thread-engaging portions are integral with the side portions. The thread-engaging portions terminate at opposed thread-engaging surfaces which are parallel and lie at an acute angle to a reference line which is perpendicular to the major axis of the flanges. The mounting elements fit in openings in the box and are held in place by abutments on the central portions and by the V-shaped flanges. In installing an electrical device in the box, screws are pushed through the central openings and into the regions between the thread-engaging surfaces. The screws may be further tightened by turning a fraction of a turn.

9 Claims, 6 Drawing Figures

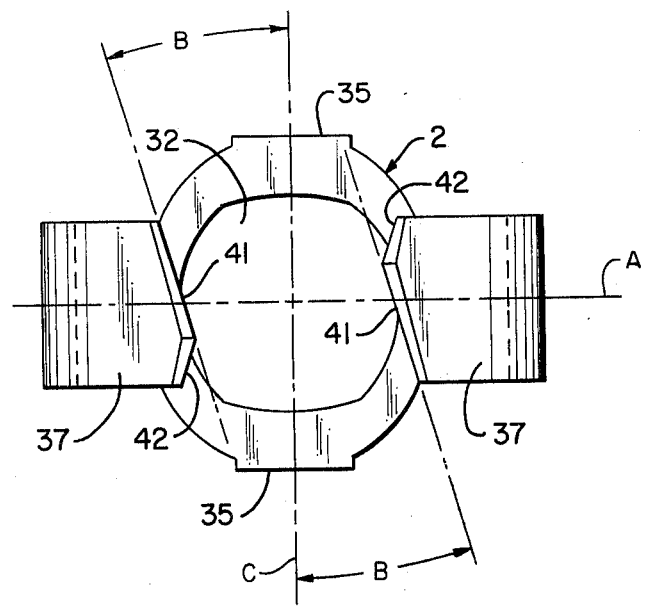
FIG. 2
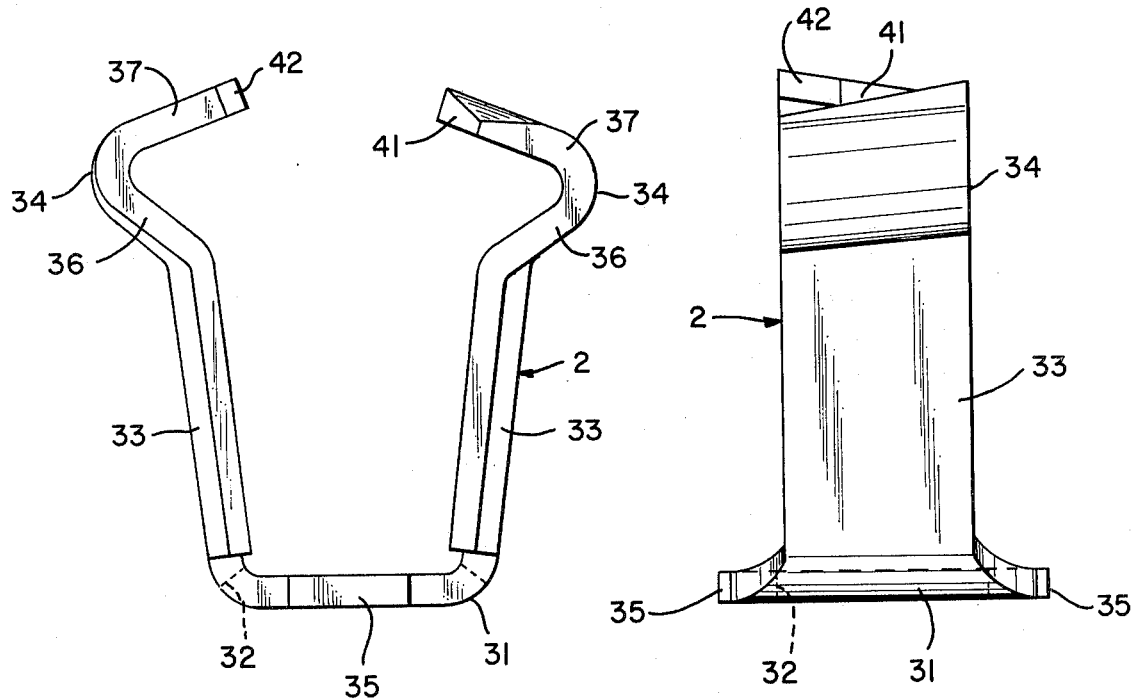
FIG. 3
FIG. 4

ELECTRICAL WIRING BOX

BACKGROUND OF THE INVENTION

The present invention relates to electrical wiring boxes. More particularly, it is concerned with electrical wiring boxes having factory-installed mounting elements associated therewith for permitting the quick and easy mounting of an electrical device within a wiring box in a field installation.

At the present time electrical devices such as receptacles and switches are most commonly mounted within electrical wiring boxes by means of screws associated with the electrical devices and threaded into openings provided in tabs or bosses of the wiring boxes. Since the screws are usually of fine pitch and of considerable length, to accommodate several possible thicknesses of wallboard or paneling, considerable time is required to completely thread a pair of the screws into the tabs or bosses of a wiring box to tightly secure an electrical device to the wiring box. As a result, and in the interest of reducing escalating labor costs, it has been found highly desirable to reduce the time and effort required to mount electrical devices within wiring boxes. Numerous attempts have been made and several proposals offered directed to a solution of the above-stated problem. A review of many of these proposals is provided in U.S. patent application Ser. No. 712,145 filed Aug. 6, 1976 by William O. Arnold and David W. Kinney entitled "Electrical Wiring Box" and assigned to the assignee of the present application.

An electrical wiring box having a pair of factory-installed mounting elements associated therewith for permitting the quick and easy mounting of an electrical device within the wiring box is described and claimed in the aforementioned patent application. The wiring box includes bosses each having a generally-rectangular opening countersunk therein for receiving a corresponding mounting element. Each of the mounting elements includes a central portion having a screw-receiving opening and a pair of abutment edge portions adjacent to the opening, a pair of spaced-apart side portions integral with the central portion, and a pair of deflective V-shaped flanges including thread-engaging portions integral with the side portions. When inserted into the associated openings, the edge portions of the central portions of the mounting elements abut against shoulders adjacent to the openings, thereby limiting the forward entry of the mounting elements into the openings, and the V-shaped flanges are positioned externally at the back ends of the openings in a manner so as to prevent removal of the mounting elements from the opening.

An electrical device is mounted within the wiring box in a field installation by simply inserting associated screws into the screw-receiving openings of the central portions of the mounting elements and pushing the screws into the region between the V-shaped flanges. As a result, the thread engaging portions of the flanges are caused to be deflected outwardly and, after the screws have been driven completely home, the thread-engaging portions come to rest between the threads of the screws, thereby firmly gripping onto the screws. The outward deflection of the V-shaped flanges by the screws further causes the mounting elements to be more completely fixed within their associated openings.

As shown and described in the aforementioned application, the thread-engaging surfaces at the opposed free ends of the thread-engaging portions are of generally semi-circular configuration. Alternatively, they may be flat or V-shaped. It has been found that with mass production of mounting elements having thread-engaging surfaces as described there may be a wide variation in the amount of torque which a mounting element can withstand upon further tightening of the screw by threading subsequent to pushing the screw into position.

SUMMARY OF THE INVENTION

In accordance with the present invention a box arrangement of a box and mounting elements is provided in which the thread-engaging surfaces of the mounting elements consistently withstand relatively large amounts of torque. The box arrangement includes a box having a plurality of walls arranged to define a space for receiving a device, and a mounting element disposed within a longitudinal opening in the box. The box further has a pair of abutment portions on opposite sides of the opening.

The mounting element has a central portion adjacent to the front of the opening in the box with a portion in abutment with a portion of the box adjacent to the opening. The central portion also has an opening through which a threaded screw may be inserted and pushed longitudinally into the mounting element. The opening is of a suitable size to permit the threaded portion of a screw to be freely and readily inserted into the mounting element without the central portion interfering with the forward movement of the screw or gripping onto the threaded portion of the screw. First and second spaced-apart side portions are connected with the central portion on opposite sides of the opening in the central portion and extend along the opening in the box.

First and second deflective sections are connected with the first and second side portions, respectively, and are positioned adjacent to the abutment portions of the box. Each deflective section includes a thread-engaging portion which extends in a direction toward the other thread-engaging portion. The thread-engaging portions have spaced-apart thread-engaging surfaces which define a screw-receiving region therebetween. The thread engaging surfaces are substantially parallel. In addition, each thread-engaging surface is at an angle with respect to a reference line lying perpendicular to the directions the thread-engaging portions extend. The thread-engaging portions are in the path of a screw pushed into the mounting element.

When a screw is inserted and pushed into the mounting element and into the screw-receiving region between the opposed thread-engaging surfaces and forced against the thread-engaging surfaces, the deflective sections are deflected outwardly in opposite directions away from the central axis of the opening in the box. The deflective sections thus become positioned closely with respect to the abutment portions of the box, fixing the mounting element in position in the opening in the box and preventing removal of the mounting element from the opening. As a screw is pushed into the screw-receiving region, the thread-engaging surfaces ride along the threads of the screw without impeding the forward movement of the screw. The thread-engaging surfaces engage the threads of the screw preventing withdrawal of the screw from the mounting element except by unthreading the screw from engagement with the thread-engaging surfaces.

BRIEF DESCRIPTION OF THE DRAWINGS

In the drawings:

FIGS. 2, 3, and 4 are top, front, and side views, respectively, of a mounting element in accordance with the invention;

For a better understanding of the present invention, together with other and further objects, advantages, and capabilities thereof, reference is made to the following discussion and appended claims in connection with the above-described drawings.

DETAILED DESCRIPTION OF THE INVENTION

Figure 1:
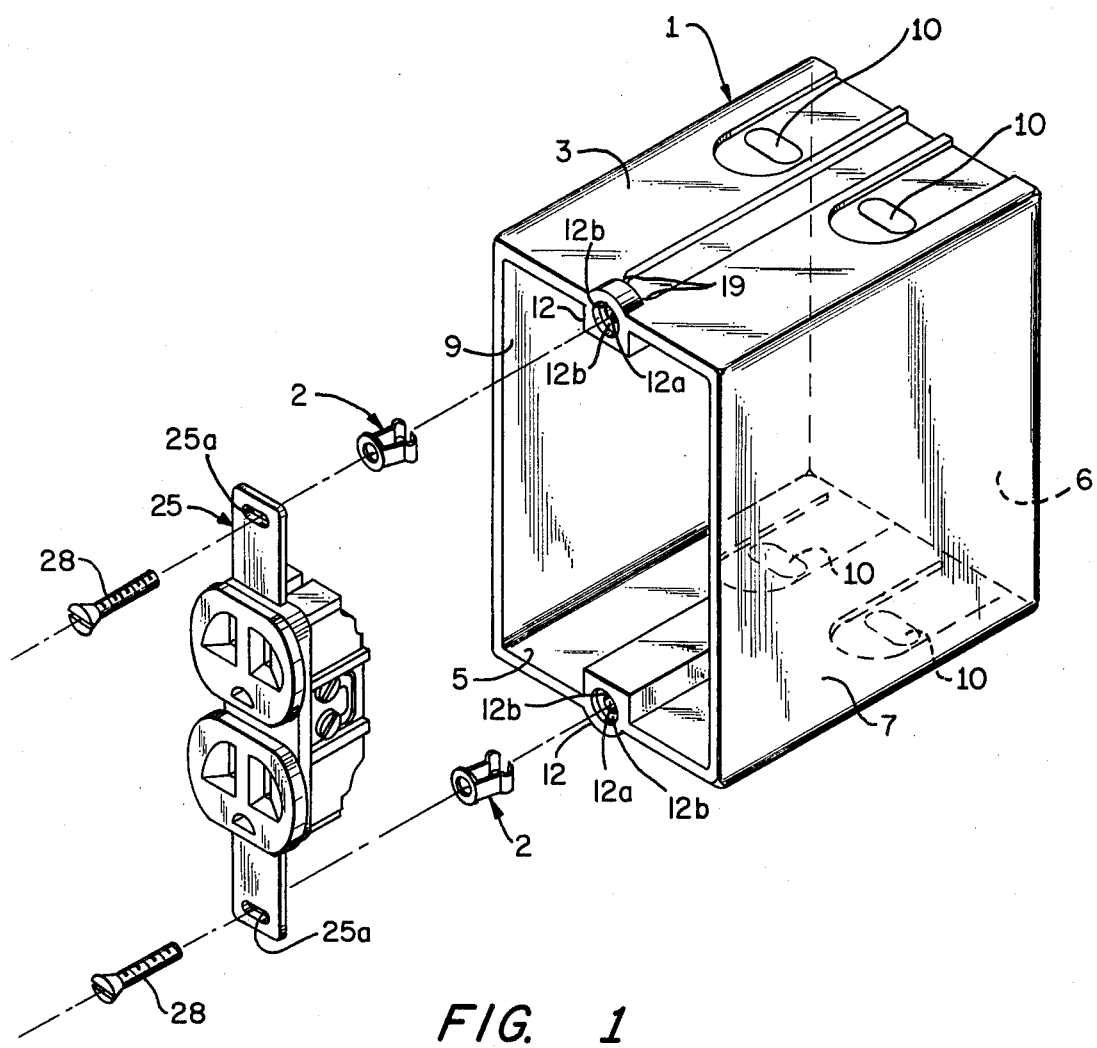
FIG. 1 is an exploded perspective view illustrating an electrical wiring box used in conjunction with a pair of mounting elements in accordance with the present invention for mounting an electrical device within the electrical wiring box.

Referring now to FIG. 1, there is shown in an exploded view an arrangement including an electrical wiring box 1 as employed in accordance with the present invention with a pair of mounting elements 2 to mount an electrical device 25 within the wiring box 1. As shown in FIG. 1, the electrical wiring box 1 includes a top wall 3, a bottom wall 5, a rear wall 6, and a pair of side walls 7 and 9. These walls define an opening at the front of the wiring box 1 and further enclose a space or volume for receiving an electrical device such as an electrical switch or receptacle as well as wires and other electrical connections associated with the electrical device. The top and bottom walls 3 and 5 further include knockout elements 10 which may be removed selectively as desired for the entrance of wire cables to make electrical connections to an electrical device which is to be mounted within the wiring box 1. Although not shown in FIG. 1, means are normally provided for the wiring box 1 for attaching the wiring box 1 to a supporting structure such as a wood stud.

The wiring box 1 further includes a pair of bosses 12 formed integrally with the top and bottom walls 3 and 5 of the wiring box 1. The bosses 12 have generally-rectangular shaped longitudinal openings 12a countersunk therein with the material of the box 1 adjacent to the horizontal dimensions of the openings 12a representing shoulders 12b. The purpose of the shoulders 12b will be explained in detail hereinbelow. The wiring box 1 further includes portions 19 adjacent to the rear of the openings 12a having abutment surfaces 19a at acute angles with respect to the central axis of the openings 12a. The purpose of the portions 19 will also be explained in detail hereinbelow.

An electrical device is mounted within the wiring box 1 by use of the aforementioned mounting elements 2, each of which is factory-installed within a corresponding one of the openings 12a in the general manner as indicated in FIG. 1. As shown in FIGS. 1–4 each of the mounting elements 2, which may be of stamped sheet metal, includes a central portion 31 having a generally-circular opening 32 therein, a pair of spaced-apart side portions 33 integral with the central portion 32, and a pair of generally V-shaped, spaced-apart flange sections 34 integral with and flaring outwardly somewhat from the ends of the side portions 33. The opening 32 in the central portion 31 of the mounting element 2 is a screw-receiving opening having a diameter greater than the diameter of the threaded portion of a mounting screw 28 and is employed, together with the side portions 33, to receive and guide a standard metal or plastic screw into and along the corresponding mounting element 2 at such time as an electrical device is to be mounted within the wiring box 1, as will be explained in greater detail hereinbelow. The central portion 31 further includes a pair of opposed edge portions 35 which, when the mounting element 2 is inserted into a corresponding one of the openings 12a, abuts against the shoulders 12b adjacent to the opening 12a and limits the forward entry and penetration of the element 2 into the opening 12a.

The above-mentioned V-shaped flange sections 34 include outwardly angled portions 36 and inwardly angled portions 37 defining the V-shapes of the flange sections 34. The outwardly angled portions 36 are retention portions which function to retain the mounting element in the opening 12a in the box 1 as will be explained hereinbelow. The inwardly angled portions 37 are thread-engaging portions. The thread-engaging portions 37 each extend in a direction toward each other along a line A as viewed in FIG. 2 and terminate in spaced-apart free ends or edges which define a screw-receiving region therebetween. The free ends have thread-engaging surfaces 41 which in accordance with the present invention are straight and parallel to each other and also lie at an acute angle B with respect to a reference line C as viewed in the top view of FIG. 2. Reference line C is perpendicular to the direction the thread-engaging portions 37 extend toward each other along line A. As viewed in the top view of FIG. 2, lines A and C are shown passing through and perpendicular to the central axis of a screw when a screw is inserted in the mounting element. The central axis of the screw coincides with the axis of the opening 12a in the box.

The two opposing thread-engaging surfaces 41 lie at slightly different positions along the central axis of a screw inserted in the mounting element as illustrated in FIGS. 3 and 4. Also the thread-engaging surfaces 41 extend at slight angles from being perpendicular to the central axis of the screw as viewed in FIG. 4. The edges of the thread-engaging surfaces 41 may be thinned to extend deeper into the valleys between the ridges of the threads. The specific dimensions of these configurations are determined by the pitch of the threads of the screws to be employed. Also, the tips of the thread-engaging portions may be cut at an angle as indicated at 42 without interfering with the action between the thread-engaging surfaces 41 and the threads of the screw.

Figure 5:
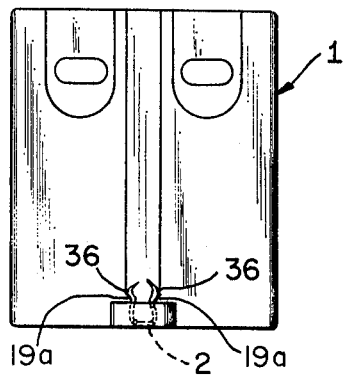
FIG. 5 is a top view of the electrical wiring box of FIG. 1 assembled together with the mounting elements in accordance with the invention.

The mounting elements 2 as described are fixed within the openings 12a of the wiring box 1, specifically, during a factory assembly operation, by first squeezing the side portions 33 together slightly, to allow the elements 2 to be readily inserted into the openings 12a, and then pushing the elements into the openings 12a until the V-shaped flange sections 34 re-emerge and spring outwardly slightly at the rear of the openings 12a. Alternatively, the openings 12a may be tapered, thereby automatically causing the side portions 33 to be squeezed together during the insertion of the elements 2 into the openings 12a. In either case, as the flange sections 34 re-emerge at the rear of the openings 12a, the edge portions 35 of the central portions 31 abut against the shoulders 12b adjacent to the openings 12a, thereby limiting the forward entry of the elements 2 into the openings 12a, and the outwardly angled retention portions 36 of the flange sections 34 are positioned closely adjacent to and may touch the angle surfaces 19a (FIG. 5) of the abutment portions 19 of the box 1. This latter positioning, or outward flaring of the flanges, which is best shown in FIG. 5, serves to retain the mounting elements 2 within the openings 12a so that they cannot be easily removed from the openings 12a by attempts to pull the elements 2 longitudinally out from the openings 12a.

Figure 6:
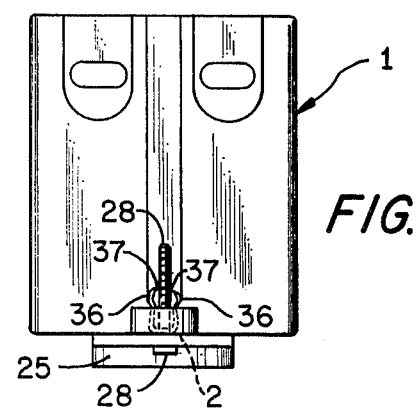
FIG. 6 is a top view of the electrical wiring box of FIG. 1 as assembled together with the mounting elements and with an electrical device mounted therein by means of a pair of screws inserted in the mounting elements.

To field-install an electrical device within the above-described wiring box 1, for example, an electrical device 25 in the form of a duplex receptacle as shown in FIGS. 1 and 6, it is only required that a pair of screws 28 be inserted by the installer through a corresponding pair of standard openings 25a in the electrical device 25 and then pushed through the opening 32 in the central portions 31 of the mounting members 2 and along the side portions 33 toward the region between the V-shaped flange sections 34. As a screw 28 is pushed into the screw-receiving region between the thread-engaging portions 37, the V-shaped flange sections 34 are forced or deflected outwardly, the thread-engaging surfaces 41 ride along the threads of the screw without impeding its forward movement or gripping on to the screw. When a screw 28 has been pushed completely home, the thread-engaging surfaces come to rest in the valleys between adjacent threads of the screw, thereby engaging the screw.

The action of pushing the screw into the screw-receiving region also has the effect of forcing the outwardly angled retention portions 36 of the V-shaped flange sections 34 further outwardly from their initial positions into very close or direct physical contact with the surfaces 19a of the portions 19 of the wiring box 1, thereby further fixing or retaining the mounting element 2 within the corresponding opening 12a. Further, by virtue of the fact that the mounting element 2 has a generally rectangular configuration and the opening 12a is generally rectangular, it is impossible for the mounting element 2 to be rotated with respect to the box or to be twisted out of the opening 12a in the box.

After a screw 28 has been pushed completely home, the screw may be further tightened by turning a fraction of a turn as with a screwdriver to bind the screw in place. The engagement of the screw by the thread-engaging surfaces as shown in FIG. 6 prevents withdrawal of the screw from the mounting element except by unthreading the screw sufficiently to disengage the screw from the thread-engaging surfaces. The screw may be withdrawn or backed off as with a screwdriver to remove the screw from the mounting element.

By employing box arrangements in accordance with the present invention as described hereinabove, a greater amount of torque may be applied in tightening the screws than was possible with previous designs of mounting elements as described in the aforementioned application of Arnold and Kinney. More particularly, with mounting elements having semi-circular, flat, or V-shaped thread-engaging surfaces as disclosed in the aforementioned application, variations in the elements and in the screws caused wide variations in the torque capability obtainable from unit to unit with mass produced devices. For example, with standard 6-32 screws the torque which could be achieved consistently was limited to about 4 inch-pounds. With box arrangements in accordance with the present invention employing mounting elements having parallel thread-engaging surfaces as described, however, higher values of torque are obtained consistently. It has been found that acceptable results can be obtained with an acute angle B of up to 35°. Optimum results are obtained with an acute angle of about 20°. For example, with standard 6-32 screws and mounting elements having an acute angle B of 20° a torque of about 7½ inch-pounds has been consistently obtained.

While there has been shown and described what is considered to be a preferred embodiment of the present invention, it will be obvious to those skilled in the art that various changes and modifications may be made therein without departing from the invention as defined by the appended claims.

What is claimed is:

1. A box arrangement comprising
a box including a plurality of walls arranged to define a space for receiving a device, said box having a longitudinal opening therein in which a mounting element is disposed and further having a pair of abutment portions on opposite sides of the opening;
said mounting element comprising
a central portion adjacent to the front of the opening in the box and having a portion in abutment with a portion of the box adjacent to the opening, said central portion having an opening therethrough by which a threaded screw may be inserted and pushed longitudinally into the mounting element, said opening being of a size to permit the threaded portion of a screw to be freely and readily inserted into the mounting element without the central portion interfering with the forward movement of the screw or gripping onto the threaded portion of the screw;
first and second spaced-apart side portions connected with the central portion on opposite sides of the opening in the central portion and extending along the opening in the box; and
first and second deflective sections connected with the first and second side portions, respectively, and adjacent to the abutment portions of the box, each deflective section including a thread-engaging portion extending in a direction toward the other thread-engaging portion, each of said thread-engaging portions having a single thread-engaging surface, the two thread-engaging surfaces being spaced apart and defining a screw receiving region therebetween, said two thread-engaging surfaces being substantially parallel and each being at an angle with respect to a reference line lying perpendicular to the directions the thread-engaging portions extend, said thread-engaging portions being in the path of a screw pushed into the mounting element whereby the screw contacts the single thread-engaging surface of each thread-engaging portion;
said deflective sections being operative when a screw is inserted and pushed into the mounting element and into the screw-receiving region between the two thread-engaging surfaces and forced against the thread-engaging surfaces to be deflected outwardly in opposite directions away from the central axis of the opening in the box and to be positioned closely with respect to the abutment portions of the box, thereby to fix the mounting element in position in the opening in the box and to prevent removal of the mounting element from the opening in the box, and the two thread-engaging surfaces being operative as a screw is pushed into the screw-receiving region to ride along the threads of the screw without impeding the forward movement of the screw, and to engage the threads of the screw so as to prevent withdrawal of the screw from the mounting element except by unthreading the screw from engagement with the thread-engaging surfaces.

2. A box arrangement in accordance with claim 1 wherein the first and second deflective sections of the mounting element include first and second retention portions attached to the first and second side portions, respectively, and angled outwardly in opposite directions from the axis of the opening in the box;

said thread-engaging portions being attached to said first and second retention portions and angled inwardly toward the axis of the opening in the box; and said first and second retention portions being operative when a screw is forced between the thread-engaging surfaces to be positioned closely with respect to the abutment portions of the box.

3. A box arrangement in accordance with claim 2 wherein said thread-engaging surfaces include straight edges at an acute angle with respect to said reference line.

4. A box arrangement in accordance with claim 3 wherein said acute angle is greater than 0° and less than about 35°.

5. A box arrangement in accordance with claim 3 wherein said acute angle is approximately 20°.

6. A box arrangement comprising a box including a plurality of walls arranged to define a space for receiving a device, said box having first and second longitudinal openings therein in which first and second mounting elements are disposed, respectively, and further having first and second pairs of abutment portions adjacent to opposite sides of the first and second openings, respectively;

each of said first and second mounting elements comprising a central portion adjacent to the front of the corresponding opening in the box and having a portion in abutment with a portion of the box adjacent to the opening, said central portion having an opening therethrough by which a threaded screw may be inserted and pushed longitudinally into the mounting element, said opening being of a size to permit the threaded portion of a screw to be freely and readily inserted into the mounting element and to be pushed into the mounting element without the central portion interfering with the forward movement of the screw or gripping onto the threaded portion of the screw;

first and second spaced-apart side portions connected with the central portion on opposite sides of the opening in the central portion and extending along the corresponding opening in the box; and first and second deflective sections connected with the first and second side portions, respectively, and adjacent to the abutment portions of the box, said first and second deflective sections including first and second retention portions attached to the first and second side portions, respectively, and angled outwardly in opposite directions from the axis of the opening in the box, said first and second deflective sections including first and second thread-engaging portions attached to the first and second retention portions, respectively, and angled inwardly toward the axis of the opening in the box with each thread-engaging portion extending in a direction toward the other thread-engaging portion;

each of said thread-engaging portions having a single thread-engaging surface, the two thread-engaging surfaces being spaced apart and defining a screw receiving region therebetween, said two thread-engaging surfaces being substantially parallel and each being at an angle with respect to a reference line lying perpendicular to the direction the thread-engaging portions extend, said thread-engaging portions being in the path of a screw pushed into the mounting element whereby the screw contacts the single thread-engaging surface of each thread-engaging portion;

said retention portions initially extending outwardly beyond the sides of the corresponding opening and positioned adjacent to the abutment portions of the corresponding pair of abutment portions of the box for retaining the mounting element within the opening, and subsequently operative when a screw is inserted and pushed into the screw-receiving region and forced between the two thread-engaging surfaces to be deflected outwardly further in opposite directions away from the axis of the corresponding opening in the box and to be positioned with respect to the abutment portions of the corresponding pair of abutment portions so as to further retain the mounting element in position in the corresponding opening in the box and prevent removal of the mounting element from the opening; and the two thread-engaging surfaces being operative as a screw is pushed into the screw-receiving region to ride along the threads of the screw without impeding the forward movement of the screw so as to prevent withdrawal of the screw from the mounting element except by unthreading the screw from engagement with the thread-engaging surfaces.

7. A box arrangement in accordance with claim 6 wherein said thread-engaging surfaces include straight edges at an acute angle with respect to said reference line.

8. A box arrangement in accordance with claim 7 wherein said acute angle is greater than 0° and less than about 35°.

9. A box arrangement in accordance with claim 6 wherein said acute angle is approximately 20°.

* * * * *